(12) United States Patent
Bai et al.

(10) Patent No.: US 10,742,370 B2
(45) Date of Patent: Aug. 11, 2020

(54) IQ MISMATCH COMPENSATION METHOD AND APPARATUS, COMPENSATION DEVICE, COMMUNICATION DEVICE AND STORAGE MEDIUM

(71) Applicant: SANECHIPS TECHNOLOGY CO., LTD., Guangdong (CN)

(72) Inventors: Liyang Bai, Guangdong (CN); Chen Cheng, Guangdong (CN); Yuanhang Sun, Guangdong (CN); Yu Li, Guangdong (CN)

(73) Assignee: SANECHIPS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/332,325

(22) PCT Filed: Apr. 28, 2017

(86) PCT No.: PCT/CN2017/082623
§ 371 (c)(1),
(2) Date: May 15, 2019

(87) PCT Pub. No.: WO2018/045765
PCT Pub. Date: Mar. 15, 2018

(65) Prior Publication Data
US 2020/0092053 A1    Mar. 19, 2020

(30) Foreign Application Priority Data

Sep. 12, 2016 (CN) .......................... 2016 1 0821859

(51) Int. Cl.
*H04B 17/11* (2015.01)
*H04L 5/00* (2006.01)
(Continued)

(52) U.S. Cl.
CPC .......... *H04L 5/001* (2013.01); *H04B 7/0845* (2013.01); *H04B 17/0085* (2013.01);
(Continued)

(58) Field of Classification Search
CPC ...... H04B 17/21; H04B 17/11; H04B 17/101; H04B 17/26; H04B 17/29; H04B 17/0085;
(Continued)

(56) References Cited

U.S. PATENT DOCUMENTS

2009/0180575 A1    7/2009 Urvas
2017/0005737 A1*   1/2017 Yang .................... H04B 17/11

FOREIGN PATENT DOCUMENTS

CN    102724150 A    10/2012
CN    102857304 A    1/2013
(Continued)

OTHER PUBLICATIONS

International Search Report dated Jun. 28, 2017 for International Application No. PCT/CN2017/082623, 6 pages.
(Continued)

*Primary Examiner* — Rahel Guarino
(74) *Attorney, Agent, or Firm* — Knobbe, Martens, Olson & Bear, LLP

(57) ABSTRACT

Disclosed are an IQ mismatch compensation method and apparatus for a radio frequency communication system, a compensation device and a communication device. The method comprises: acquiring an interaction result of test signals between a transmitting component and a receiving component; obtaining angle mismatch parameters of a predetermined type according to the interaction result; determining a frequency domain compensator for performing mismatch compensation on the frequency-dependent angle mismatch parameters according to the following formulae:
(Continued)

$Y(w)=X(w)-jP(w)^*X^*(-w)$ and $Y(-w)=X(-w)+jP(w)^*X^*(w)$; and performing frequency domain compensation on the frequency-dependent angle mismatch parameters by using the frequency domain compensator. Also disclosed is a computer storage medium.

17 Claims, 9 Drawing Sheets

(51) Int. Cl.
  *H04B 17/10* (2015.01)
  *H04B 7/08* (2006.01)
  *H04B 17/00* (2015.01)
  *H04L 25/03* (2006.01)

(52) U.S. Cl.
  CPC .......... *H04B 17/101* (2015.01); *H04B 17/11* (2015.01); *H04L 25/03828* (2013.01)

(58) Field of Classification Search
  CPC . H04B 17/0845; H04L 27/3863; H04L 5/001; H04L 27/265; H04L 25/03828; H04L 27/3872; G01S 2007/2883; G01S 2007/2886; G01S 7/288; H03D 3/009
  See application file for complete search history.

(56) References Cited

FOREIGN PATENT DOCUMENTS

| | | | |
|---|---|---|---|
| CN | 103036846 A | 4/2013 |
| CN | 104980376 A | 10/2015 |

OTHER PUBLICATIONS

Written Opinion of the International Searching Authority dated Jun. 28, 2017 for International Application No. PCT/CN2017/082623, 3 pages.

* cited by examiner

IQ MISMATCH COMPENSATION METHOD AND APPARATUS, COMPENSATION DEVICE, COMMUNICATION DEVICE AND STORAGE MEDIUM

This is a National Phase Application, filed under 35 U.S.C. 371, of International Patent Application No. PCT/CN2017/082623, filed on Apr. 28, 2017, which claims priority to Chinese patent application No. 201610821859.8 filed on Sep. 12, 2016, contents of both of which are incorporated herein by reference in their entireties.

This application claims priority to a Chinese patent application No. 201610821859.8 filed on Sep. 12, 2016, disclosure of which is incorporated herein by reference in its entirety.

TECHNICAL FIELD

The present disclosure relates to the field of wireless communications and, in particular, to an IQ mismatch compensation method and apparatus, a compensation device, a communication device, and a storage medium.

BACKGROUND

As shown in FIG. 1, in an orthogonal frequency division multiplexing (OFDM) communication system that directly performs up/down conversion, the analog radio frequency circuit is greatly simplified compared to the conventional intermediate frequency radio frequency circuit, but at the same time an impact of chip manufacturing process variations on the system is also amplified. The in-phase and quadrature (IQ) mismatch refers to that simultaneously transmitted I-path signal and Q-path signal have inconsistent amplitudes and have phases not strictly satisfying the 90-degree orthogonal relationship, and is a kind of interference item that has a great influence on performance of the communication system. Here, the I-path signal and the Q-path signal may be two ways of signals formed by performing orthogonal decomposition on the same communication signal.

The IQ mismatch is mainly generated from two analog devices (101, 102, 103, 104, 106, 107, and 108). One of the two analog devices is an IQ two-way low-pass filter (101, 102, 105, and 106) in the analog baseband circuit. Due to process variations, the poles of one way of the low-pass filter are offset from the other way so that a difference is generated between the IQ two-way low-pass filters, resulting in a difference in the amplitude frequency response and the phase frequency response of the signals passing through the two-way filter. Generally at the same frequency, the difference in amplitude between the two ways is called the amplitude mismatch, and the orthogonal difference in phase between the two ways is called the angle mismatch. Since the pole offset is mainly reflected in the response change at high frequencies, the amplitude mismatch and the angle mismatch of the filter vary with frequencies, and are called the frequency-dependent IQ mismatch.

Another major device that introduces the IQ mismatch is the mixer (103, 104, 107, and 108), and the IQ mismatch is specifically caused by the amplitude gain difference and the initial phase difference of the IQ two-way mixer. Its mismatch feature is that the gain difference and the initial phase difference of the mixer are fixed regardless of the input signal of the mixer, that is, the amplitude mismatch and the angle mismatch do not vary with frequencies and then are called the constant mismatch.

In FIG. 1, the ADC represents an analog-to-digital converter, and the DAC represents a digital-to-analog converter. The IQ mismatch has a great impact on the error vector magnitude (EVM) of the received signal. Especially for high-order mapping such as 256-Quadrature Amplitude Modulation (QAM), the mapping constellations are relatively close and the robustness to the error is poor, so the requirements for EVM are very high. For example, the general commercially required EVM for the 256-QAM should be less than −45 dB. At this time, if the IQ merely has an angle mismatch of 1° or an amplitude mismatch of 0.2 dB, the requirement cannot be satisfied, and such variation is common for the filming process, so how to perform IQ compensation to meet the requirement for high communication quality needs to be considered.

SUMMARY

In view of this, embodiments of the present disclosure are to provide an IQ mismatch compensation method and apparatus, a compensation device, a communication device, and a storage medium, to at least partially solve the above problem.

The technical solution of the present disclosure is implemented as follows.

A first aspect of the embodiments of the present disclosure provides an IQ mismatch compensation method for a radio frequency communication system. The method includes steps described below.

An interaction result of test signals between a transmitting component and a receiving component is acquired.

A predetermined type angle mismatch parameter is obtained according to the interaction result. A predetermined type mismatch parameter includes a frequency-dependent angle mismatch parameter.

A frequency domain compensator for performing mismatch compensation on the frequency-dependent angle mismatch parameter is determined according to following formulae:

$$Y(w)=X(w)-jP(w)^*X^*(-w);$$

$$Y(-w)=X(-w)+jP(w)^*X^*(w).$$

Where w is a sequence number of a subcarrier in a positive half frequency included in an orthogonal frequency division multiplexing (OFDM) baseband, Y(w) and Y(−w) are frequency domain signals after being performed compensation, X(−w) and X(w) are frequency domain signals before being performed compensation, P(w) is the frequency-dependent angle mismatch parameter for a subcarrier sequence number of w, X*(w) is a conjugate complex number of X(w), X*(−w) is a conjugate complex number of X(−w), and j represents an imaginary part symbol.

Frequency domain compensation is performed on the frequency-dependent angle mismatch parameter by using the frequency domain compensator.

A second aspect of the embodiments of the present disclosure provides an IQ mismatch compensation apparatus for a radio frequency communication system. The apparatus includes an acquisition unit, an obtaining unit, a determination unit and a compensation unit.

The acquisition unit is configured to acquire an interaction result of test signals between a transmitting component and a receiving component.

The obtaining unit is configured to obtain a predetermined type angle mismatch parameter according to the interaction result. A predetermined type mismatch parameter includes a frequency-dependent angle mismatch parameter.

The determination unit is configured to determine a frequency domain compensator for performing mismatch compensation on the frequency-dependent angle mismatch parameter according to following formulae:

$$Y(w)=X(w)-jP(w)*X*(-w);$$

$$Y(-w)=X(-w)+jP(w)*X*(w).$$

Where w is a sequence number of a subcarrier in a positive half frequency included in an orthogonal frequency division multiplexing (OFDM) baseband, Y(w) and Y(-w) are frequency domain signals after being performed compensation, X(-w) and X(w) are frequency domain signals before being performed compensation, P(w) is a frequency-dependent angle mismatch parameter for a frequency corresponding to w, X*(w) is a conjugate complex number of X(w), X*(-w) is a conjugate complex number of X(-w), and j represents an imaginary part symbol.

The compensation unit is configured to perform frequency domain compensation on the frequency-dependent angle mismatch parameter by using the frequency domain compensator.

A third aspect of the embodiments of the present disclosure provides a compensation device. The compensation device includes a frequency domain compensator for performing frequency domain compensation on a frequency-dependent mismatch parameter.

The frequency domain compensator includes: a first adder, a second adder, a first multiplier, and a second multiplier.

The first adder is connected to the first multiplier.

The second adder is connected to the second multiplier.

The first multiplier is configured to compute -jP(w)*X*(-w).

The second multiplier is configured to compute jP(w)*X*(w).

The first adder is configured to compute X(w)-jP(w)*X*(-w) to obtain Y(w).

The second adder is configured to compute X(-w)+jP(w)*X*(w) to obtain Y(-w).

Where w is a sequence number of a subcarrier in a positive half frequency included in an orthogonal frequency division multiplexing (OFDM) baseband, Y(w) and Y(-w) are frequency domain signals after being performed compensation, X(-w) and X(w) are frequency domain signals before being performed compensation, P(w) is the frequency-dependent angle mismatch parameter for a subcarrier sequence number of w, X*(w) is a conjugate complex number of X(w), X*(-w) is a conjugate complex number of X(-w), and j represents an imaginary part symbol.

A sixth aspect of the embodiments of the present disclosure provides a communication device. The communication device includes any one of the foregoing compensation devices.

An embodiment of the present disclosure provides a computer storage medium configured to store computer programs for implementing the foregoing IQ mismatch compensation method after the computer programs are executed.

The IQ mismatch compensation method and apparatus, the compensation device and the communication device provided by the embodiments of the present disclosure use the frequency domain compensator determined by Y(w)=X(w)-jP(w)*X*(-w) and Y(-w)=X(-w)+jP(w)*X*(w). The frequency domain compensator configured to perform compensation on the frequency-dependent mismatch on the frequency domain is formed by two adders and two multipliers, is characterized by simple structure and simple implementation, meanwhile is characterized by high compensation accuracy and high compensation gain with respect to the existing time domain compensation method, and may be used for IQ mismatch compensation of the radio frequency communication system.

DETAILED DESCRIPTION

Preferred embodiments of the present disclosure will be described in detail in conjunction with the drawings, and it should be understood that the preferred embodiments described hereinafter are only intended to describe and explain the present disclosure and not to limit the present disclosure.

Figure 2:
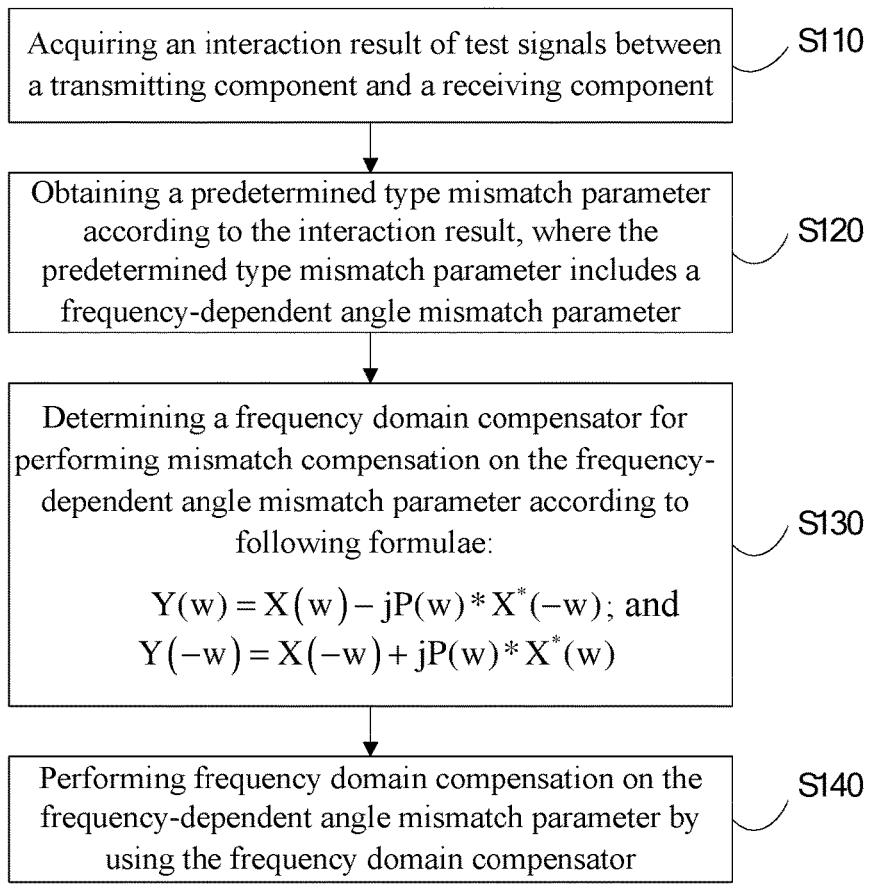
FIG. 2 is a flowchart illustrating a first IQ mismatch compensation method according to an embodiment of the present disclosure.

As shown in FIG. 2, an embodiment provides an IQ mismatch compensation method for a radio frequency communication system. The method includes steps described below.

In S110, an interaction result of test signals between a transmitting component and a receiving component is acquired.

In S120, a predetermined type angle mismatch parameter is obtained according to the interaction result. A predetermined type mismatch parameter includes a frequency-dependent angle mismatch parameter.

In S130, a frequency domain compensator for performing mismatch compensation on the frequency-dependent angle mismatch parameter is determined according to following formulae:

$$Y(w)=X(w)-jP(w)^*X^*(-w); \text{ and}$$

$$Y(-w)=X(-w)+jP(w)^*X^*(w).$$

Where w is a sequence number of a subcarrier in a positive half frequency comprised in an orthogonal frequency division multiplexing (OFDM) baseband, Y(w) and Y(-w) are frequency domain signals after being performed compensation, X(-w) and X(w) are frequency domain signals before being performed compensation, P(w) is the frequency-dependent angle mismatch parameter for the subcarrier sequence number of w, X*(w) is a conjugate complex number of X(w), X*(-w) is a conjugate complex number of X(-w), and j represents an imaginary part symbol.

In S140, frequency domain compensation is performed on the frequency-dependent angle mismatch parameter by using the frequency domain compensator.

Figure 3:
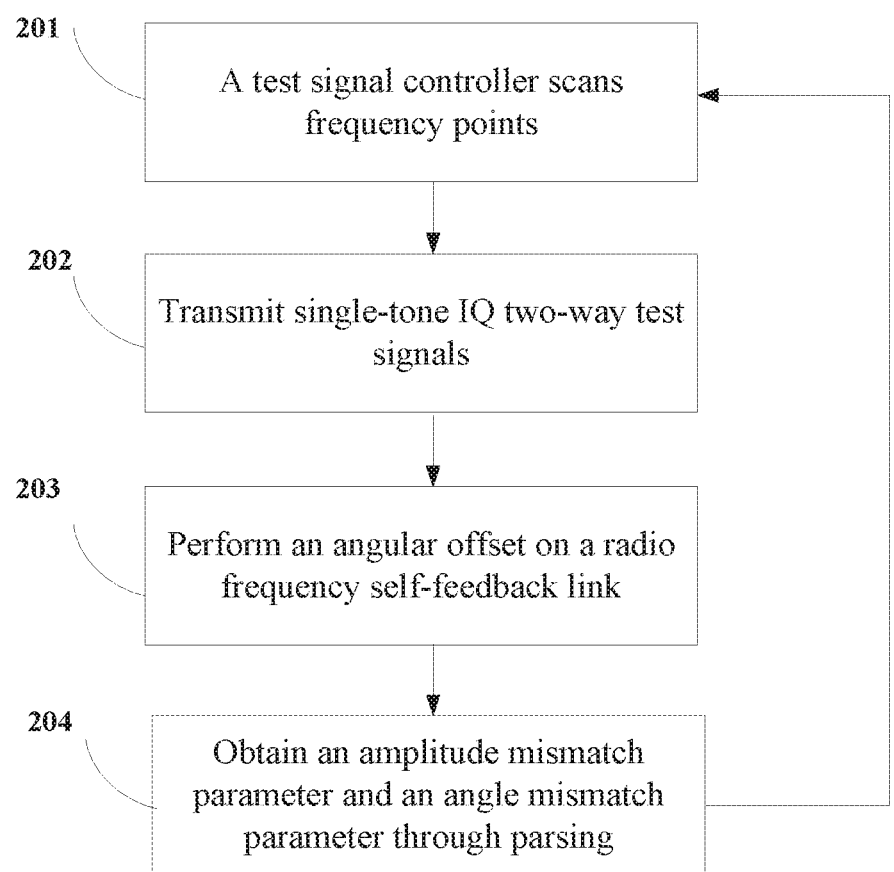
FIG. 3 is a flowchart illustrating test signal interaction between a transmitting component and a receiving component according to an embodiment of the present disclosure.

As shown in FIG. 3, the step S110 may include the steps described below.

In a step 201, a test signal controller scans frequency points, for example, frequency points that need to be scanned are set in the test signal controller, and all communication frequency points may be scanned. If the scan time overhead is considered, merely a half or a quarter of the frequency band of the passband is scanned according to the IQ mismatch property, and merely one or two frequency points in the remaining low-frequency band are scanned.

Figure 4:
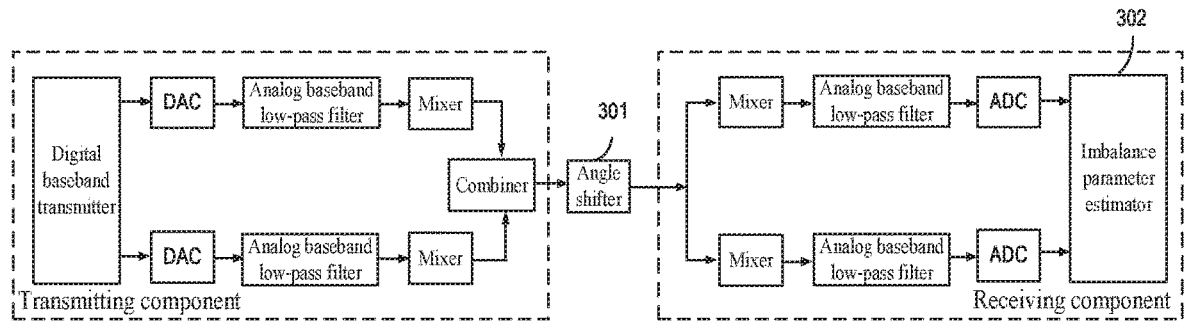
FIG. 4 is a structural diagram of testing a mismatch parameter according to an embodiment of the present disclosure.

In a step 202, single-tone IQ two-way test signals are transmitted. Specifically, the test signal controller controls the transmitting component to transmit the IQ two-way orthogonal single-tone signals one by one according to the set frequency points. The transmission path of the test signals is as shown in FIG. 4.

In a step 203, an angular offset is performed on a radio frequency self-feedback link. For example, the angular offset is performed by using the angle shifter 301 shown in FIG. 4. An angle shifter (301) and a mismatch parameter estimator are added to the system internal self-loop parameter estimation link shown in FIG. 4, and can be used to perform calibration simultaneously on IQ mismatches of the transmitting component part and the receiving component part of any independent communication machine in the system. The mismatch parameter estimator 302 is used for performing mismatch parameter estimation.

In a step 204, the amplitude mismatch parameter and the angle mismatch parameter are obtained through parsing. For example, the mismatch parameter estimator 302 shown in FIG. 4 is used for performing amplitude mismatch parameter estimation and angle mismatch parameter estimation.

Figure 5:
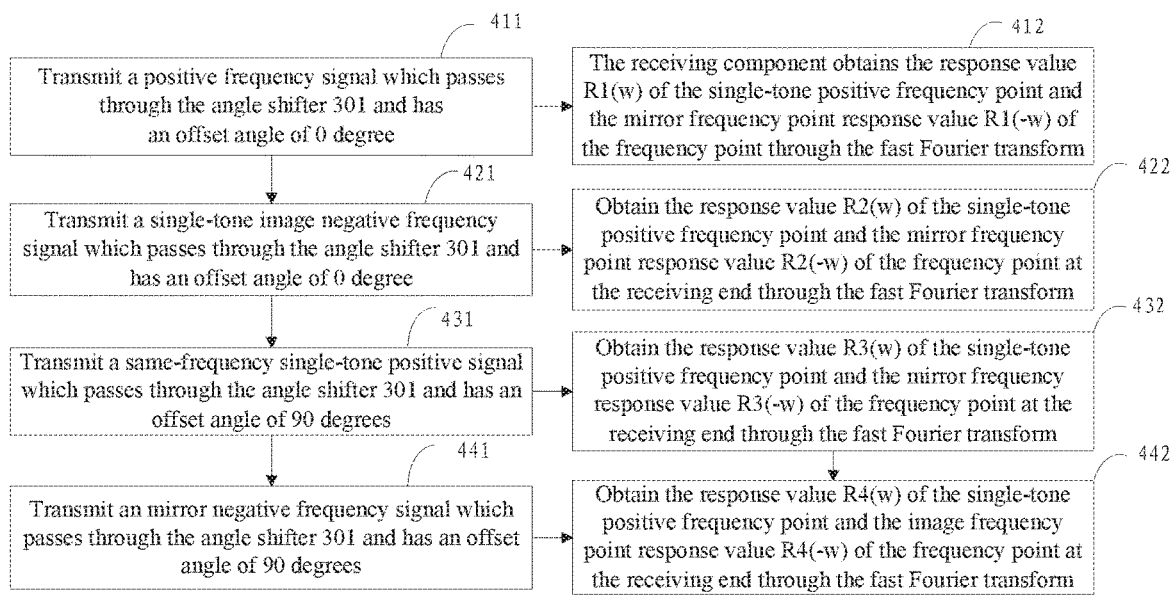
FIG. 5 is a flowchart of evaluating a mismatch parameter according to the embodiment of the present disclosure.

FIG. 5 is a flowchart of performing the above mismatch parameter estimation. The steps described below are included.

In a step 411, a positive frequency signal is transmitted, the positive frequency signal passes through the angle shifter 301, and has an offset angle of 0 degree.

In a step 412, the receiving component obtains the response value R1(w) of the single-tone positive frequency and the image frequency point response value R1(-w) of the frequency through the fast Fourier transform.

In a step 421, a single-tone image negative frequency signal is transmitted, the single-tone image negative frequency signal passes through the angle shifter 301, and has an offset angle of 0 degree.

In a step 422, the response value R2 (w) of the single-tone positive frequency and the image frequency point response value R2 (-w) of the frequency are obtained at the receiving end through the fast Fourier transform.

In a step 431, a same-frequency single-tone positive signal is transmitted, the same-frequency single-tone positive signal passes through the angle shifter 301, and has an offset angle of 90 degrees.

In a step 432, the response value R3 (w) of the single-tone positive frequency and the image frequency response value R3 (-w) of the frequency are obtained at the receiving end through the fast Fourier transform.

In a step 441, an image negative frequency signal is transmitted, the image negative frequency signal passes through the angle shifter 301, and has an offset angle of 90 degrees.

In a step 442, the response value R4(w) of the single-tone positive frequency and the image frequency response value R4(-w) of the frequency are obtained at the receiving end through the fast Fourier transform.

Generally, the IQ mismatch phenomenon is specifically divided into four types.

The first type mismatch is the frequency-dependent angle mismatch.

The second type mismatch is the constant angle mismatch.

The third type mismatch is the frequency-dependent amplitude mismatch.

The fourth type mismatch is the constant amplitude mismatch.

A finally obtained cooperation estimation formula of the first type mismatch and the second type mismatch for the transmitting component is as follows:

$$a_{tx}(w) = -I\left[\frac{R3^*(w)R1(-w) - R3(-w)R1^*(w)}{R3^*(w)R2(-w) - R4(-w)R1^*(w)}\right] \text{unit (rad)}$$

A cooperation estimation formula of the first type mismatch and the second type mismatch for the receiving component is as follows:

$$a_{rx}(w) = -I\left[\frac{R2(-w)R3(-w) - R1(-w)R4(-w)}{R3^*(w)R2(-w) - R4(-w)R1^*(w)}\right] \text{unit (rad)}$$

A cooperation estimation formula of the third type mismatch and the fourth type mismatch for the transmitting component is as follows:

$$g_{tx}(w) = 1 + 2\text{Re}\left[\frac{R3^*(w)R1(-w) - R3(-w)R1^*(w)}{R3^*(w)R2(-w) - R4(-2)R1^*(w)}\right] \text{unit (rad)}$$

A cooperation estimation formula of the third type mismatch and the fourth type mismatch for the receiving component is as follows:

$$g_{rx}(w) = 1 + 2\text{Re}\left[\frac{R2(-w)R3(-w) - R1(-w)R4(-w)}{R3^*(w)R2(-w) - R4(-w)R1^*(w)}\right] \text{unit (rad)}.$$

where w is a subcarrier sequence number of a frequency in an OFDM digital baseband and in a mismatch mail of the test signal, and the sequence number is a positive value. The subcarrier frequency points included in the positive half frequency in the OFDM digital baseband are generally taken as w. For example, one OFDM symbol has 64 subcarriers, the negative half frequency has 32 subcarriers sequentially numbered −31 to 0 from the low frequency to the high frequency, and the positive half frequency has 32 subcarriers sequentially numbered 1 to 32 from the low frequency to the high frequency. Here, w merely refers to the sequence numbers 1 to 32 of subcarriers in the positive half frequency, −w refers to corresponding sequence numbers of subcarriers in the negative half frequency, (•)* represents complex conjugate, Re[•] represents an operation of obtaining a real part, and I[•] represents an operation of obtaining an imaginary part.

For simplicity of description, $a_{tx}(w)$ and $a_{rx}(w)$ may be collectively named as $a(w)$, and $g_{tx}(w)$ and $g_{rx}(w)$ may be collectively named as $g(w)$.

The parameters $a(w)$ are then divided into a first type mismatch parameter and a second type mismatch parameter. The criterion for distinguishing is based on the characteristics of the IQ mismatch of an analog filter. The mismatch is mainly concentrated at high frequencies, and almost no mismatch exists at low frequencies. Therefore, the first type mismatch is not existed at the lowest frequency and a second type mismatch may be considered as for the lowest frequency in the parameter $a(1)$. The second type mismatch parameter is represented by Pdc below. The first type mismatch parameter can be obtained by subtracting Pdc from $a(w)$ of each frequency point, and is denoted by P(w) below.

The frequency domain compensator is determined in the step S130 according to the following mathematical expressions:

$$Y(w)=X(w)-jP(w)^*X^*(-w);$$

$$Y(-w)=X(-w)+jP(w)^*X^*(w).$$

Where w is a sequence number of a subcarrier in a positive half frequency comprised in an orthogonal frequency division multiplexing (OFDM) baseband, Y(w) and Y(−w) are frequency domain signals after being performed compensation, X(−w) and X(w) are frequency domain signals before being performed compensation, P(w) is the frequency-dependent angle mismatch parameter for the subcarrier sequence number of w, X*(w) is a conjugate complex number of X(w), X*(−w) is a conjugate complex number of X(−w), and j represents an imaginary part symbol.

Figure 6:
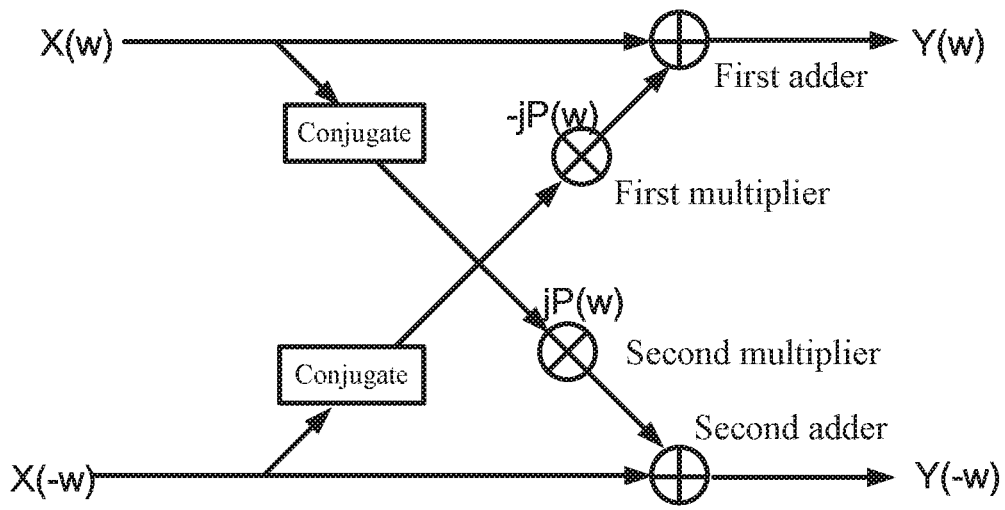
FIG. 6 is a structural diagram of a frequency domain compensator according to an embodiment of the present disclosure.

The structure of the frequency domain compensator determined by the above mathematical expressions may be as shown in FIG. 6. The frequency domain compensator includes: a first adder, a second adder, a first multiplier and a second multiplier. The first adder is connected to the first multiplier. The second adder is connected to the second multiplier. The first multiplier is configured to compute −jP(w)*X*(−w). The second multiplier is configured to compute jP(w)*X*(w). The first adder is configured to compute X(w)−jP(w)*X*(−w) to obtain Y(w). The second adder is configured to compute X(−w)+jP(w)*X*(w) to obtain Y(−w). Therefore in this embodiment, a new structure used to perform compensation on the first type mismatch in the frequency domain is provided, and can improve the accuracy of the first type mismatch compensation and reduce the hardware overhead of compensation. Specifically, the method of the present disclosure is used to perform compensation in the frequency domain.

Merely two multipliers and two adders are needed for each frequency point, and no register is needed in the middle. Compared with the existing time domain compensation method, a resource is saved and an additional compensation gain of about 1 dB may be obtained. Therefore, a characteristic of good compensation effect is provided.

The step S120 may further include that a cooperation mismatch parameter of a frequency-dependent amplitude mismatch and a constant amplitude mismatch is obtained. The cooperation mismatch parameter of the frequency-dependent amplitude mismatch and the constant amplitude mismatch may be denoted as g(w).

The method further includes steps described below.

The number of taps of a finite impulse response (FIR) filter in a first type time domain compensator is determined according to a relationship between a sampling rate of a communication device and an OFDM data bandwidth.

Delay time of the FIR filter to an input signal is determined according to the number of delay (D) flip-flops.

A delayer connected in parallel with the FIR filter is determined. Delay time of the delayer is equal to the delay time of the FIR filter to the input signal.

The number of D flip-flops connected in series in the FIR filter is determined according to the number of taps, and generally the number of D flip-flops is the number of taps minus one. For example, if the number of taps is five, the number of D flip-flops is usually four, and the four D flip-flops are connected in series. The delay time of the FIR filter to the input signal is equal to half of the sum of the delay time of all D flip-flops. Thus, the delay time of the delayer is equivalent to be equal to half of the sum of the delay time of all D flip-flops.

A tap coefficient of each tap of the FIR filter is determined according to the cooperation mismatch parameter.

The frequency-dependent amplitude mismatch and the constant amplitude mismatch are compensated for by using the first type time domain compensator.

In this embodiment, the frequency-dependent amplitude mismatch and the constant amplitude mismatch are compensated for by using the time domain compensator.

Therefore, not only the first type mismatch can be compensated for, but also the third type mismatch and the fourth type mismatch can be compensated for by adding the above steps.

The first type time domain compensator having 5 taps and having 9 taps are introduced below respectively.

For example, in condition that the sampling rate is the same as the OFDM data bandwidth, the number of taps in the first type time domain compensator is determined to be 5.

The tap coefficient is determined according to following formulae:

$$h(1) = h(5) = \frac{1}{2N}\left[2\sum_{w=1}^{N-1} g(w)\cos\left(\frac{2\pi w}{N}\right) + g(0) + g(N)\right]$$

$$h(2) = h(4) = \frac{1}{2N}\left[2\sum_{w=1}^{N-1} g(w)\cos\left(\frac{\pi w}{N}\right) + g(0) - g(N)\right]$$

$$h(3) = \frac{1}{N}\left[\sum_{w=0}^{N-1} g(w)\right].$$

Where h(1) is a first tap coefficient, h(2) is a second tap coefficient, h(3) is a third tap coefficient, h(4) is a fourth tap coefficient, h(5) is a fifth tap coefficient, h(6) is a sixth tap coefficient, h(7) is a seventh tap coefficient, h(8) is an eighth tap coefficient, and h(9) is a ninth tap coefficient, w represents a subcarrier sequence number of a subcarrier included in a positive half frequency in the OFDM data bandwidth, g(w) is a cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

The total number of subcarriers is generally represented as the number of points of the fast Fourier transform (FFT) or the inverse fast (IF) Fourier transform (FT). h(1) to h(5) represent five tap coefficients.

In the above calculation expressions of the tap coefficient, the number (N+1) of frequency points is required for g(w). When the single-tone scan test signal is sent for mismatch estimation, a case of merely a part of the frequency points being scanned may exist, and the mismatch parameter g(0) on the direct current frequency and the mismatch parameter g(N) on the Nyquist frequency may especially not be scanned. In this case, the present disclosure allows the principle of "nearest-replication" for the mismatch parameter of a frequency point without being scanned. That is, a mismatch estimation value of the nearest scanned frequency point is copied as a mismatch estimation value of the current frequency point.

Figure 7:
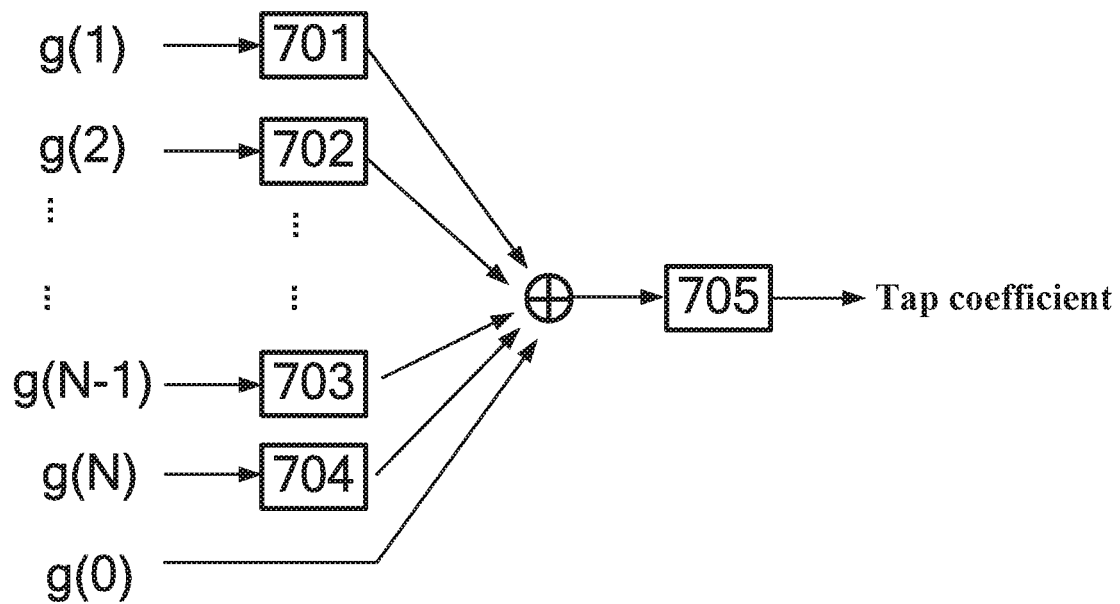
FIG. 7 is a flowchart of determining a tap coefficient of a first type time domain compensator according to an embodiment of the present disclosure.

The hardware computing structure reflected by the above mathematical expressions is shown in FIG. 7. In the figure, 701 to 705 represent multiplicative operations, and 705 is fixed to be 1/(2N). For the first tap and the fifth tap, 701 is $$2\cos\left(\frac{2\pi}{N}\right),$$

702 is $$2\cos\left(\frac{4\pi}{N}\right),$$

703 is $$2\cos\left(\frac{2\pi}{N}(N-1)\right),$$

and 704 is −1. For the second tap and the fourth tap, 701 is $$2\cos\left(\frac{\pi}{N}\right),$$

702 is $$2\cos\left(\frac{2\pi}{N}\right),$$

703 is $$2\cos\left(\frac{\pi}{N}(N-1)\right),$$

and 704 is 1. For the third tap, 701 to 704 are all 1.

Figure 8:
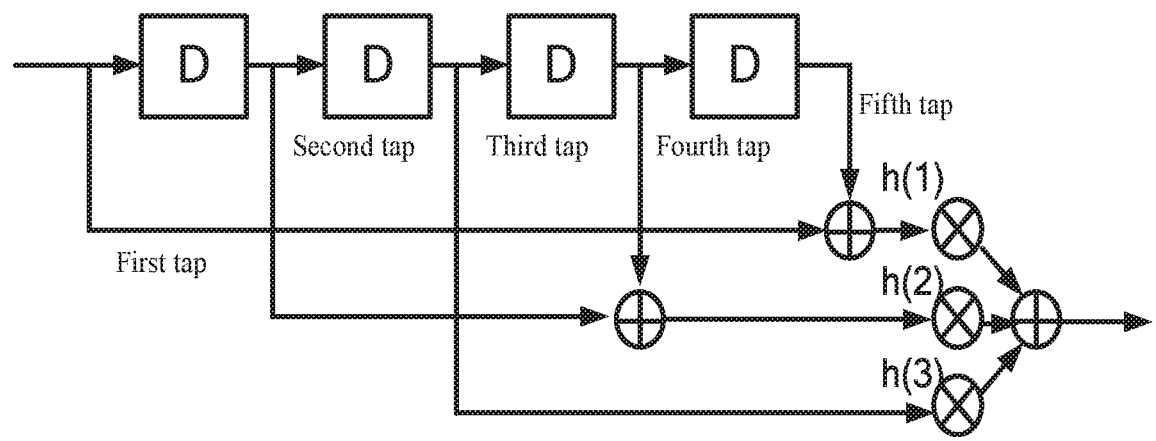
FIG. 8 is a structural diagram of a 5-tap finite impulse response (FIR) filter according to an embodiment of the present disclosure.

A 5-tap FIR filter in the first type time domain compensator provided by an embodiment of the present disclosure is shown in FIG. 8 and includes four D flip-flops connected in series. h(1) is equal to h(5) and h(2) is equal to h(4), so in order to reduce a use of the multiplier, transmission data of the first tap and the fifth tap are added by using the adder and then multiplied by h(1) or h(5) by using the multiplier; and transmission data of the second tap and the fourth tap are added by using the adder and then multiplied by h(2) or h(4) by using the multiplier. In this way, two adders are used in place of two multipliers due to one aspect that the multiplier itself has a more complex structure and more complicated computing than the adder. The structure of the first type time domain compensator is obviously simplified. In specific implementation, each of the taps may be separately multiplied by a multiplier whose multiplication coefficient is equal to the corresponding tap coefficient, and then the products are added to be outputted, which is not limited to the structure shown in FIG. 7.

In condition that the sampling rate is twice the OFDM data bandwidth, the number of taps in the first type time domain compensator is determined to be nine.

The tap coefficient is determined according to following formulae:

$$h(1) = h(9) = \frac{1}{2N}\left[2\sum_{w=1}^{N-1} g(w)\cos\left(\frac{2\pi w}{N}\right) + g(0) + g(N)\right];$$

$$h(3) = h(7) = \frac{1}{2N}\left[2\sum_{w=1}^{N-1} g(w)\cos\left(\frac{\pi w}{N}\right) + g(0) - g(N)\right]$$

$$h(5) = \frac{1}{N}\left[\sum_{w=0}^{N-1} g(w)\right]$$

$$h(2) = h(4) = h(6) = h(8) = 0.$$

Where h(1) is a first tap coefficient, h(2) is a second tap coefficient, h(3) is a third tap coefficient, h(4) is a fourth tap coefficient, h(5) is a fifth tap coefficient, h(6) is a sixth tap coefficient, h(7) is a seventh tap coefficient, h(8) is an eighth tap coefficient, and h(9) is a ninth tap coefficient.

w represents a subcarrier sequence number of a subcarrier included in a positive half frequency in the OFDM data bandwidth, g(w) is a cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

Figure 9:
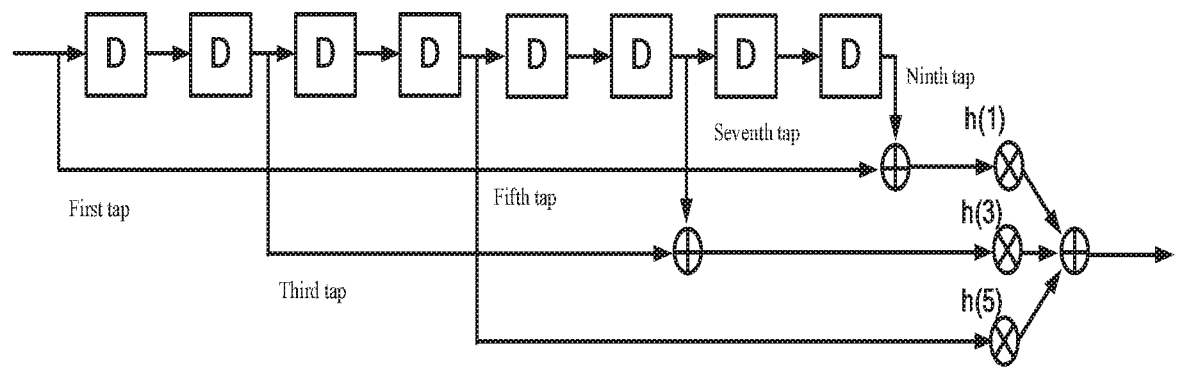
FIG. 9 is a structural diagram of a 9-tap FIR filter according to an embodiment of the present disclosure.

FIG. 9 is a 9-tap FIR filter in the first type time domain compensator according to an embodiment of the present disclosure. Since h(2)=h(4)=h(6)=h(8)=0, the corresponding taps are omitted in FIG. 9. The tap coefficients of the first tap and the ninth tap are equal and the tap coefficients of the third tap and the seventh tap are equal and the like, so in order to reduce the use of the multiplier to reduce the structure complexity and computing complexity of the first type time domain compensator, in the embodiment, the transmission data of the first tap and the ninth tap are added through the adder, and then multiplied by the tap coefficient of the first tap or the ninth tap through the same multiplier; and the transmission data of the third tap and the seventh tap are added through the adder, and then multiplied by the tap coefficient of the third tap or the seventh tap through a multiplier. It is worth noting that in the specific implementation process, the transmission data of each tap may further be multiplied by the corresponding tap coefficient through the multiplier, and then the products are added to be outputted, which is not limited to the FIR filter shown in FIG. 9.

In summary, the coefficient computing method and the corresponding structure of the FIR filter for performing time domain compensation for the third and fourth types of mismatches are simplified in two different cases. Multiplication and addition operations are performed on real numbers, and each coefficient is computed using only the number (M−1) of multiplications and the number M of additions. The real-time compensation is improved and no loss in accuracy exists.

In some embodiments, the predetermined type mismatch parameter further includes: a constant angle mismatch parameter.

The method further includes that: a second type time domain compensator is determined and a constant angle mismatch corresponding to the constant angle mismatch parameter is compensated for by using the second type time domain compensator.

Figure 10:
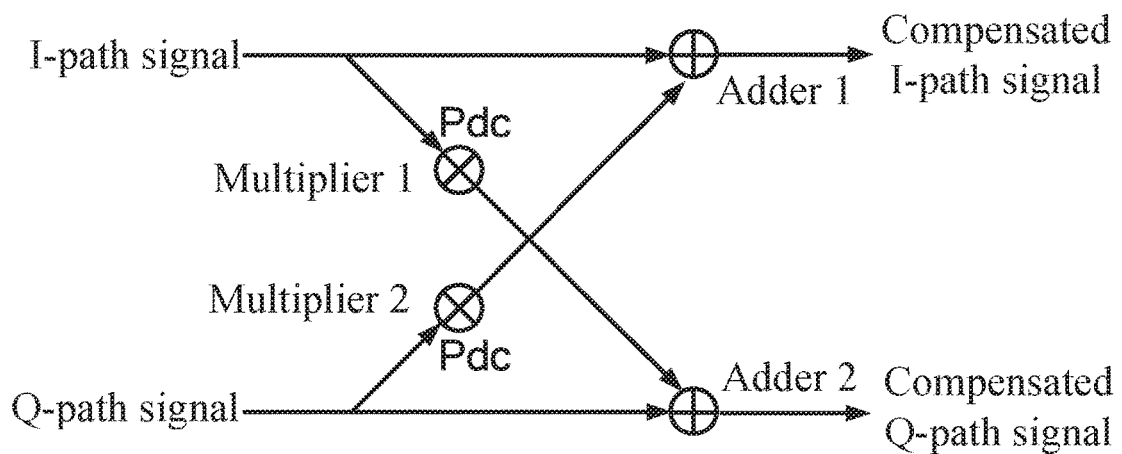
FIG. 10 is a structural diagram of a second type time domain compensator according to an embodiment of the present disclosure.

In FIG. 10, Pdc represents the second type mismatch parameter, i.e., the mismatch parameter of the constant-dependent mismatch. The second type time domain compensator includes: a multiplier 1, a multiplier 2, an adder 1 and an adder 2.

The multiplier 1 is connected in series with the adder 2, and then is connected in parallel with the adder 1.

The multiplier 2 is connected in series with the adder 1, and then is connected in parallel with the adder 2.

The I-path signal is respectively inputted to the multiplier 1 and the adder 1; the Q-path signal is respectively inputted to the multiplier 2 and the adder 2; the adder 2 outputs the compensated I-path signal; and the adder 1 outputs the compensated Q-path signal. Here, the I-path signal and the Q-path signal are both time domain signals. The multiplication coefficients of the multiplier 1 and the multiplier 2 are both Pdc.

In some embodiments, the method further includes steps described below.

The method further includes steps described below.

In condition that the communication device is the transmitting component, mismatch pre-compensation is performed on a mismatch of a transmitting signal by using the frequency domain compensator, the second type time domain compensator, and the first type time domain compensator in sequence.

And/or in condition that the communication device is the receiving component, mismatch compensation is performed on a received signal by using the first type time domain compensator, the first type time domain compensator, and the frequency domain compensator in sequence.

In the embodiment, the communication device may include a transmitting component and a receiving component. The transmitting component is a communication terminal transmitting a wireless signal; and the receiving component is a communication terminal receiving the wireless signal.

Figure 11:
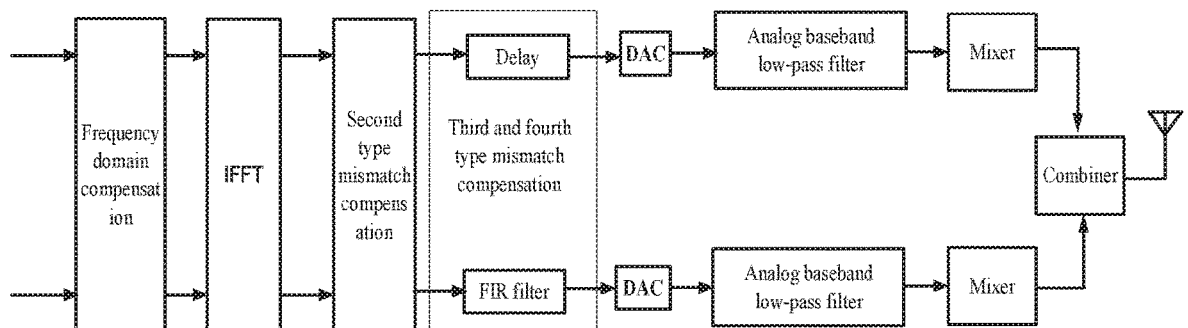
FIG. 11 is a structural diagram of a transmitting component according to an embodiment of the present disclosure.
Figure 12:
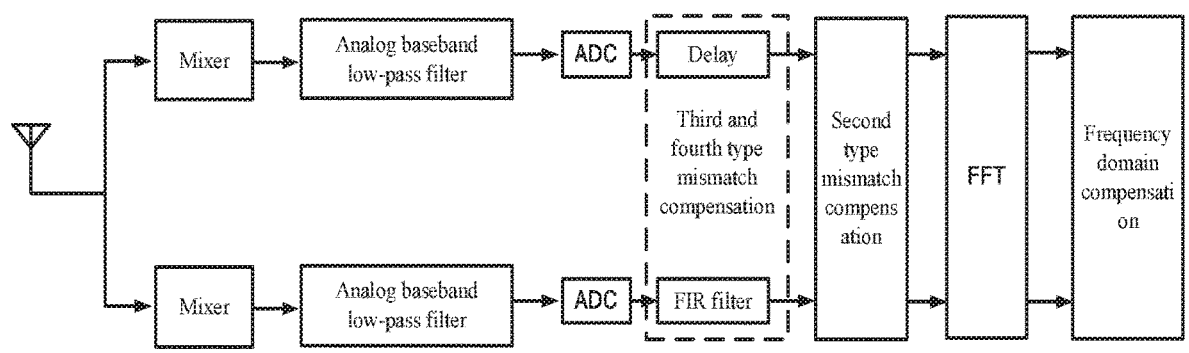
FIG. 12 is a structural diagram of a receiving component according to the embodiment of the present disclosure.

FIG. 11 is a schematic diagram of a transmitting component processing a transmitting signal according to an embodiment of the present disclosure. FIG. 12 is a schematic diagram of a receiving component processing a received signal according to the embodiment of the present disclosure.

In the transmitting component, the compensation occurs before the mismatch phenomenon, so the compensation is referred to as mismatch pre-compensation. The compensation is performed in a following order: first the first type mismatch is pre-compensated in the frequency domain, the signal passes through the IFFT module and is converted into a time domain signal, the second type mismatch is pre-compensated by using the second type time domain compensator in the time domain, and the amplitude mismatch is pre-compensated by using the first type time domain compensator including the FIR filter in the time domain. After the digital-to-analog conversion (DAC) is performed, through the mismatch pre-compensation performed by passing through the analog filter and the mixer, the transmitted signal is in a state without mismatch.

In the receiving component, the position of each IQ mismatch compensator and the relative position of the analog device are provided. The compensation mechanism is performed after the mismatch occurs and is in a following order: first the amplitude mismatch is compensated by using the first type time domain compensator including the FIR filter in the time domain, then the second type mismatch is compensated by using the second type time domain compensator in the time domain, the signal passes through the FFT module and the frequency domain is converted into a frequency domain signal, and the first type mismatch is compensated in the frequency domain.

In some embodiments, the method further includes steps described below.

The frequency domain compensator, the first type time domain compensator and the first type time domain compensator are enabled or disabled according to the predetermined type mismatch parameter.

To enable the corresponding compensator is to make the corresponding compensator in the working state, and to disable the corresponding compensator is to make the corresponding compensator not in the working state. In the embodiment, the step in which the corresponding compensator is enabled or disabled according to the predetermined type mismatch parameter may include that: in condition that the mismatch parameter represented by the predetermined type mismatch parameter is less than a predetermined threshold, the corresponding compensator may be disabled, otherwise the corresponding compensator is enabled for performing compensation accordingly.

Figure 13:
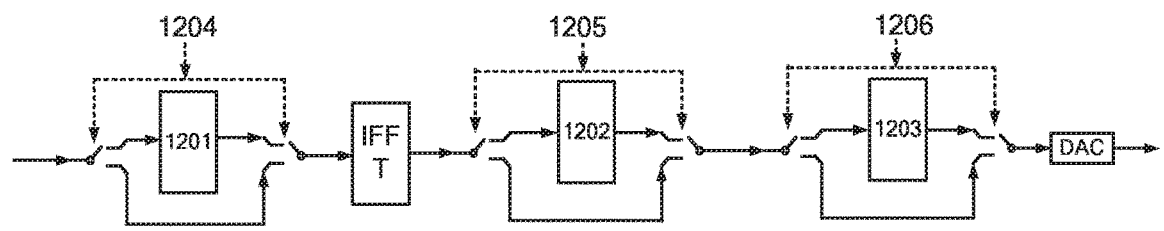
FIG. 13 is a structural diagram of a compensation device according to an embodiment of the present disclosure.

For example, since three separately arranged compensators are used for performing compensation for four mismatches in the embodiment, an enable switch structure is allowed in the present disclosure, and any one of the three compensators is enabled or disabled, as shown in FIG. 13. 1201 represents a frequency compensator, 1202 represents a second type time domain compensator, and 1203 represents a first type time domain compensator. Three compensator enable switches 1204 to 1206 may be set to respectively control the three compensators, and in condition that a compensator is determined not to be enabled, the compensator is bypassed and the next operation is performed. Since IQ mismatch is caused by process variations, only the upper limit and yield of IQ mismatch can be controlled in production, and the specific value of IQ mismatch is different for each product. Therefore in the compensation preparation stage, if a certain type mismatch parameter is estimated to be small (for example, in the 256-QAM mapping manner, the EVM is required to be not more than 45 dB, and if an angle caused by cooperation of the first type mismatch and the second type mismatch is less than 0.2 degrees, or if an amplitude caused by cooperation of the third type mismatch and the fourth type mismatch is less than −53 dB), the corresponding compensator may be turned off, so that the signal flow bypasses the compensator and directly enters the next step. This function has two advantages. One is to save the power to be consumed by the turned-off compensator. The other is that the premise of the compensation for the first type mismatch in the frequency domain in the present disclosure is that the baseband OFDM signal spectrum is symmetrically centered on the zero frequency point, most protocols satisfy this requirement, while for some special protocols that do not meet the above conditions, the frequency domain compensator for the first type mismatch may be directly turned off, and each subsequent compensator on the time domain still can be used.

In summary, in the embodiment, the frequency domain compensation and the time domain compensation each are provided with an enable switch, which can save the power to be consumed by the turned-off compensator on one hand, and avoid the influence of the frequency domain compensation manner on the baseband signal that is not centered on the zero frequency point on the other hand.

Figure 14:
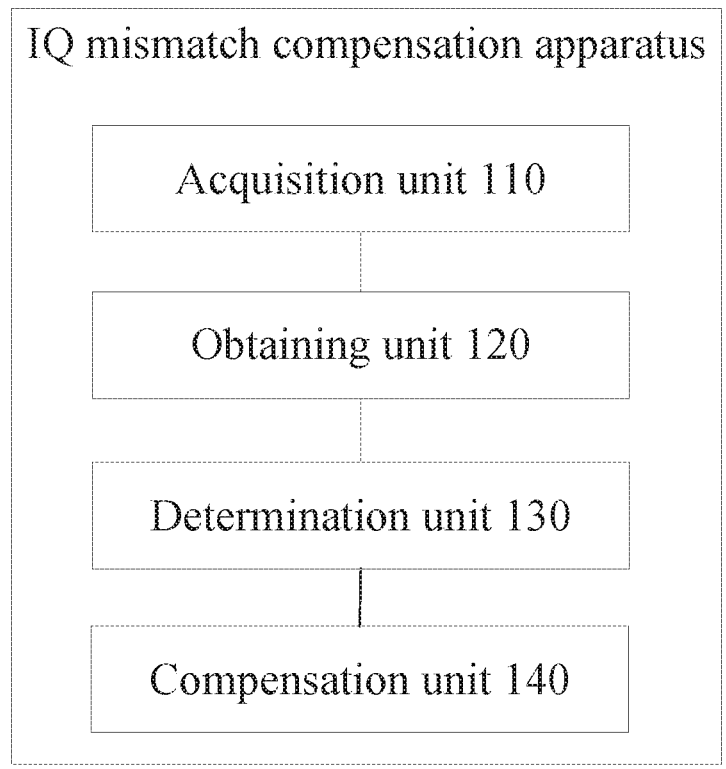
FIG. 14 is a structural diagram of an IQ mismatch compensation apparatus according to an embodiment of the present disclosure.

As shown in FIG. 14, an embodiment provides an IQ mismatch compensation apparatus for a radio frequency communication system. The apparatus includes an acquisition unit 110, an obtaining unit 120, a determination unit 130, and a compensation unit 140.

The acquisition unit 110 is configured to acquire an interaction result of test signals between a transmitting component and a receiving component.

The obtaining unit 120 is configured to obtain a predetermined type angle mismatch parameter according to the interaction result. A predetermined type angle mismatch parameter includes a frequency-dependent angle mismatch parameter.

The determination unit 130 is configured to determine a frequency domain compensator for performing mismatch compensation on the frequency-dependent angle mismatch parameter according to following formulae:

$$Y(w) = X(w) - jP(w)^* X^*(-w)$$

$$Y(-w) = X(-w) + jP(w)^* X^*(w)$$

where w is a sequence number of a subcarrier in a positive half frequency included in an orthogonal frequency division multiplexing (OFDM) baseband, Y(w) and Y(−w) are frequency domain signals after being performed compensation, X(−w) and X(w) are frequency domain signals before being performed compensation, P(w) is a frequency-dependent angle mismatch parameter of a frequency corresponding to w, X*(w) is a conjugate complex number of X(w), X*(−w) is a conjugate complex number of X(−w), and j represents an imaginary part symbol.

The compensation unit 140 is configured to perform frequency domain compensation on the frequency-dependent angle mismatch parameter by using the frequency domain compensator.

In the embodiment, the acquisition unit 110, the obtaining unit 120, the determination unit 130, and the compensation unit 140 may correspond to a processor or a processing circuit and the like. The processor may include a central processing unit (CPU), a microcontroller unit (MCU), a digital signal processor (DSP), a programmable logic controller (PLC), an application processor (AP), and the like. The processing circuit may include an application specific integrated circuit.

The processor or the application specific integrated circuit may execute predetermined instructions to perform the above functions, and thereby the first type time domain compensator can be easily determined. The determination of the first type time domain compensator herein may include determination of a structure and a structure parameter of the first type time domain compensator. The structure herein may include component devices and a connection structure between the component devices; and the structure parameter may include the aforementioned tap coefficient, and the frequency angle mismatch compensation in at least the IQ mismatch may be easily accomplished.

The frequency domain compensator determined by the apparatus in the embodiment may be as shown in FIG. 6.

In some embodiments, the obtaining unit 120 is configured to obtain a cooperation mismatch parameter of a frequency-dependent amplitude mismatch and a constant amplitude mismatch.

The determination unit 130 is further configured to determine the number of taps of a FIR filter in the first type time domain compensator according to a relationship between a sampling rate of a communication device and an OFDM data bandwidth; determine, according to the number of taps, the number of delay (D) flip-flops sequentially connected in series in the FIR filter; determine delay time of the FIR filter to an input signal according to the number of D flip-flops; determine a delayer connected in parallel with the FIR filter; and determine a tap coefficient of each tap of the FIR filter according to the cooperation mismatch parameter. The compensation unit 140 is further configured to perform compensation on the frequency-dependent amplitude mismatch and the constant amplitude mismatch by using the first type time domain compensator.

The apparatus provided in the embodiment also performs mismatch compensation for the third type mismatch and fourth type mismatch through the first type time domain compensator.

For example, the determination unit 130 is configured to determine that a number of taps in the first type time domain compensator is 5 in condition that a sampling rate is the same as an OFDM data bandwidth.

The tap coefficient is determined according to following formulae:

$$h(1) = h(5) = \frac{1}{2N}\left[2\sum_{w=1}^{N-1} g(w)\cos\left(\frac{2\pi w}{N}\right) + g(0) + g(N)\right]$$

$$h(2) = h(4) = \frac{1}{2N}\left[2\sum_{w=1}^{N-1} g(w)\cos\left(\frac{\pi w}{N}\right) + g(0) - g(N)\right]$$

$$h(3) = \frac{1}{N}\left[\sum_{w=0}^{N-1} g(w)\right].$$

where h(1) is a first tap coefficient, h(2) is a second tap coefficient, h(3) is a third tap coefficient, h(4) is a fourth tap coefficient, h(5) is a fifth tap coefficient, w represents a subcarrier sequence number of a subcarrier included in a positive half frequency in the OFDM data bandwidth, g(w) is the cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

The structure of the FIR filter of the first type time domain compensator determined by the determination unit 130 in the embodiment may be as shown in FIG. 8.

In some embodiments, the determination unit 130 is configured to determine that the number of taps in the first type time domain compensator is 9 in condition that the sampling rate is twice the OFDM data bandwidth.

The tap coefficient is determined according to following formulae:

$$h(1) = h(9) = \frac{1}{2N}\left[2\sum_{w=1}^{N-1} g(w)\cos\left(\frac{2\pi w}{N}\right) + g(0) + g(N)\right];$$

$$h(3) = h(7) = \frac{1}{2N}\left[2\sum_{w=1}^{N-1} g(w)\cos\left(\frac{\pi w}{N}\right) + g(0) - g(N)\right]$$

$$h(5) = \frac{1}{N}\left[\sum_{w=0}^{N-1} g(w)\right]$$

$$h(2) = h(4) = h(6) = h(8) = 0.$$

Where h(1) is a first tap coefficient, h(2) is a second tap coefficient, h(3) is a third tap coefficient, h(4) is a fourth tap coefficient, h(5) is a fifth tap coefficient, h(6) is a sixth tap coefficient, h(7) is a seventh tap coefficient, h(8) is an eighth tap coefficient, and h(9) is a ninth tap coefficient.

w represents a subcarrier sequence number of a subcarrier included in a positive half frequency in the OFDM data bandwidth, g(w) is a cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

The FIR filter of the first type time domain compensator determined by the determination unit 130 in the embodiment may be as shown in FIG. 9.

In some embodiments, the predetermined type mismatch parameter further includes: a constant angle mismatch parameter; the determination unit 130 is further configured to determine a second type time domain compensator; and the compensation unit 140 is further configured to perform compensation on a constant angle mismatch corresponding to the constant angle mismatch parameter by using the second type time domain compensator. FIG. 9 shows a structure of the second type time domain compensator according to an embodiment of the present disclosure. In the embodiment, the second type mismatch can also be compensated through the second type time domain compensator, to achieve the better compensation for the IQ mismatch.

In some embodiments, the compensation unit 140 is configured to perform mismatch pre-compensation for a mismatch of a transmitting signal by using the frequency domain compensator, the second type time domain compensator, and the first type time domain compensator in sequence in condition that the communication device is specifically the transmitting component; and/or perform mismatch compensation on a received signal by using the first type time domain compensator, the first type time domain compensator and the frequency domain compensator in sequence in condition that the communication device is the receiving component. The transmitting component is configured to send a signal to the receiving component, and the signal transmitted in the transmitting component is referred to as a transmitting signal in the embodiment. The receiving component is configured to receive a signal, and the signal transmitted in the receiving component is referred to as a received signal.

In the embodiment, the feature of high compensation precision can be ensured according to the transmission of the transmitting signal and the received signal and by using the compensators determined in the foregoing embodiment in order for compensation.

In the embodiment, the compensation unit 140 is further configured to enable or disable the frequency domain compensator, the first type time domain compensator and the first type time domain compensator according to the predetermined type mismatch parameter.

In the process of signal transmission, mismatches in some phenomena may be small. In the embodiment, the corresponding compensator is enabled or disabled according to the predetermined type mismatch parameter, so that the problem of complicated processing and large signal processing delay caused by continuous compensation for small mismatches is solved.

An embodiment provides a compensation device. The compensation device includes a frequency domain compensator for performing frequency domain compensation on a frequency-dependent mismatch parameter.

As shown in FIG. 6, the frequency domain compensator includes: a first adder, a second adder, a first multiplier, and a second multiplier. The first adder is connected to the first multiplier. The second adder is connected to the second multiplier. The first multiplier is configured to compute $-jP(w)*X*(-w)$. The second multiplier is configured to compute $jP(w)*X*(w)$. The first adder is configured to compute $X(w)-jP(w)*X*(-w)$ to obtain $Y(w)$. The second adder is configured to compute $X(-w)+jP(w)*X*(w)$ to obtain $Y(-w)$. w is a sequence number of a subcarrier in a positive half frequency included in an orthogonal frequency division multiplexing (OFDM) baseband, $Y(w)$ and $Y(-w)$ are frequency domain signals after being performed compensation, $X(-w)$ and $X(w)$ are frequency domain signals before being performed compensation, $P(w)$ is the frequency-dependent angle mismatch parameter for the subcarrier sequence number of w, $X*(w)$ is a conjugate complex number of $X(w)$, $X*(-w)$ is a conjugate complex number of $X(-w)$, and j represents an imaginary part symbol.

In the embodiment, merely two adders and two multipliers are used for performing compensation for the first type mismatch, which has the characteristics of simplicity in compensation and good compensation effect.

In some embodiments, the compensation device further includes a first type time domain compensator configured to perform compensation on a frequency-dependent amplitude mismatch and a constant amplitude mismatch.

The first type time domain compensator includes
 a finite impulse response (FIR) filter; and
 a delayer having delay time equal to delay time of the FIR filter to an input signal, where the delayer is connected in parallel with the FIR filter.

The FIR filter includes a plurality of D flip-flops connected in series; the number of D flip-flops is determined according to the number of taps of the FIR filter; the number of taps is determined based on a relationship between a sampling rate of a communication device and an OFDM data bandwidth.

A tap coefficient of a tap is determined by a cooperation mismatch parameter of the frequency-dependent amplitude mismatch and the constant amplitude mismatch.

For example, in condition that the sampling rate is the same as the OFDM data bandwidth, the number of taps in the first type time domain compensator is determined to be 5.

Five tap coefficients are determined according to following formulae:

$$h(1) = h(5) = \frac{1}{2N}\left[2\sum_{w=1}^{N-1}g(w)\cos\left(\frac{2\pi w}{N}\right) + g(0) + g(N)\right]$$

$$h(2) = h(4) = \frac{1}{2N}\left[2\sum_{w=1}^{N-1}g(w)\cos\left(\frac{\pi w}{N}\right) + g(0) - g(N)\right]$$

$$h(3) = \frac{1}{N}\left[\sum_{w=0}^{N-1}g(w)\right].$$

Where h(1) is a first tap coefficient, h(2) is a second tap coefficient, h(3) is a third tap coefficient, h(4) is a fourth tap coefficient, h(5) is a fifth tap coefficient, w represents a subcarrier sequence number of a subcarrier included in a positive half frequency in the OFDM data bandwidth, g(w) is the cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

FIG. 8 is a structure of a FIR filter of the first type time domain compensator including five taps.

For another example, in condition that the sampling rate is twice the OFDM data bandwidth, the number of taps in the first type time domain compensator is determined to be nine.

Nine tap coefficients are determined according to following formulae:

$$h(1) = h(9) = \frac{1}{2N}\left[2\sum_{w=1}^{N-1}g(w)\cos\left(\frac{2\pi w}{N}\right) + g(0) + g(N)\right];$$

$$h(3) = h(7) = \frac{1}{2N}\left[2\sum_{w=1}^{N-1}g(w)\cos\left(\frac{\pi w}{N}\right) + g(0) - g(N)\right]$$

$$h(5) = \frac{1}{N}\left[\sum_{w=0}^{N-1}g(w)\right]$$

$$h(2) = h(4) = h(6) = h(8) = 0.$$

h(1) is a first tap coefficient, h(2) is a second tap coefficient, h(3) is a third tap coefficient, h(4) is a fourth tap coefficient, h(S) is a fifth tap coefficient, h(6) is a sixth tap coefficient, h(7) is a seventh tap coefficient, h(8) is an eighth tap coefficient, and h(9) is a ninth tap coefficient, w represents a subcarrier sequence number of a subcarrier included in a positive half frequency in the OFDM data bandwidth, g(w) is a cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

FIG. 9 is a structure of a FIR filter in the first type time domain compensator according to an embodiment of the present disclosure.

In the embodiment, the compensation device further includes a second type time domain compensator configured to perform compensation on a constant angle mismatch. The second type time domain compensator may be as shown in FIG. 10.

As shown in FIG. 13, the compensation device includes enable switches; and the enable switch is configured to enable or disable the frequency domain compensator, the first type time domain compensator and the first type time domain compensator according to the predetermined type mismatch parameter. Through the arrangement of the enable switches, the corresponding compensators may be disabled when one or more mismatches are small, thereby simplifying the compensation step and reducing the signal processing time delay.

The embodiment provides a communication device including the compensation device provided by any one of the foregoing technical solutions. The communication device in the embodiment may be a transmitting component and/or a receiving component. The structure of the transmitting component may be as shown in FIG. 11, and the structure of the receiving component may be as shown in FIG. 12. The communication device provided by the embodiment and used for communication has the characteristics of good compensation effect for IQ mismatch.

Several specific examples are provided below in conjunction with any of the above embodiments.

Example 1

Figure 15:
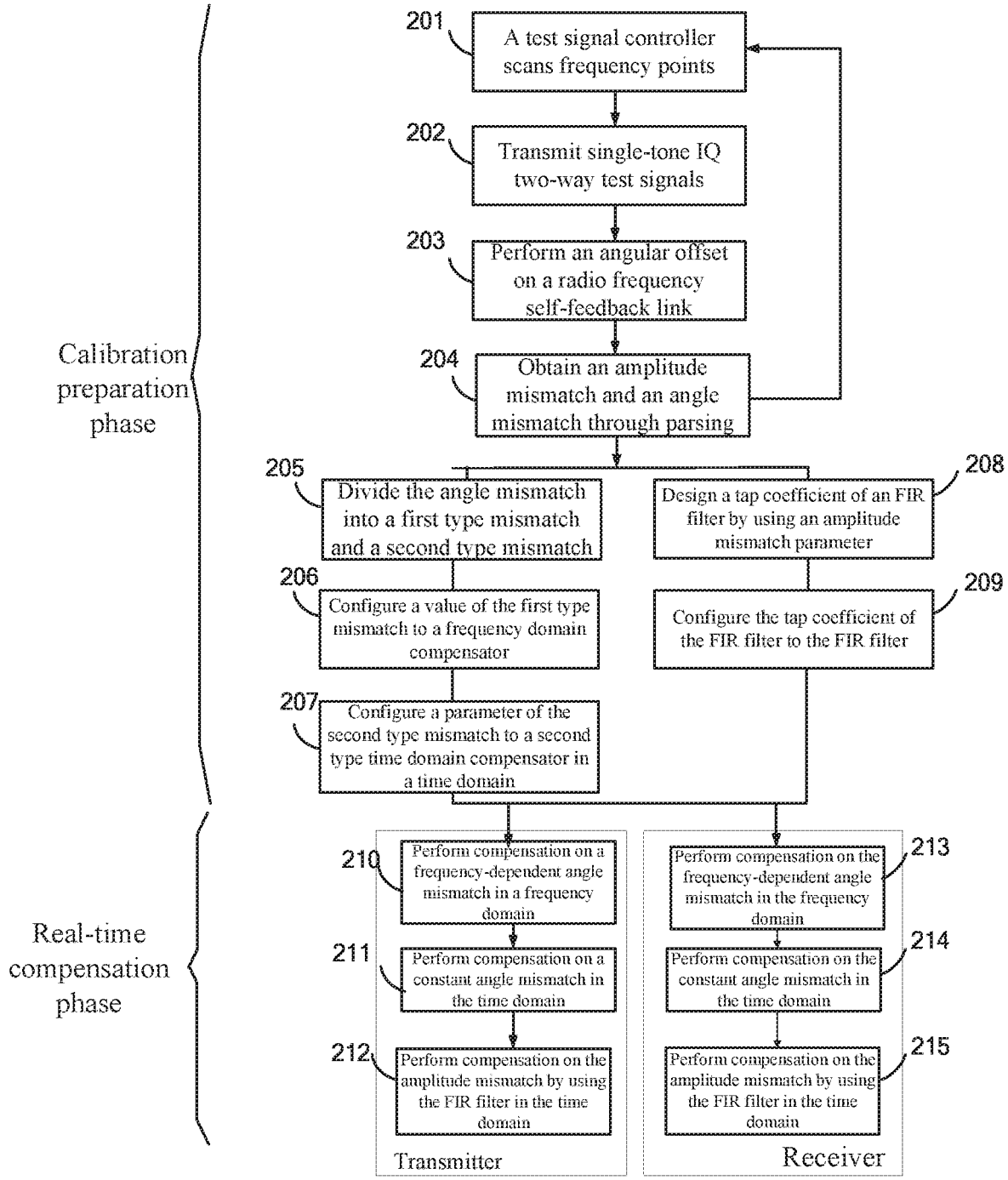
FIG. 15 is a flowchart of a second IQ mismatch compensation method for a radio frequency communication system according to an embodiment of the present disclosure.

As shown in FIG. 15, the example provides an IQ mismatch compensation method. The method includes: a calibration preparation phase and a real-time compensation phase.

The calibration preparation phase includes the steps described below.

In a step 201, a test signal controller scans frequency points.

In a step 202, single-tone IQ two-way test signals are transmitted.

In a step 203, an angular offset is performed on a radio frequency self-feedback link.

In a step 204, an amplitude mismatch and an angle mismatch are obtained through parsing.

In a step 205, the angle mismatch is divided into a first type mismatch and a second type mismatch.

In a step 206, a parameter of the first type mismatch is configured to a frequency domain compensator.

In a step 207, a parameter of the second type mismatch is configured to a second type time domain compensator in the time domain.

In a step 208, a tap coefficient of the FIR filter is designed by using an amplitude mismatch parameter.

In a step 209, the tap coefficient of the FIR filter is configured to the FIR filter.

The first type time domain compensator, the second type time domain compensator and the frequency domain compensator are devices in a communication system and are automatic designs done by performing a predetermined operation.

The real-time compensation phase includes a compensation method in a transmitting component and a compensation method in a receiving component.

The compensation method in the transmitting component includes steps 210, 211 and 212 in sequence.

In a step 210, a frequency-dependent angle mismatch is compensated by using the frequency domain compensator in a frequency domain.

In a step 211, a constant angle mismatch is compensated in the time domain.

In a step 212, the amplitude mismatch is compensated by using the FIR filter in the time domain.

The compensation method in the receiving component includes steps 213, 214 and 215 in sequence.

In a step 213, the frequency-dependent angle mismatch is compensated in the frequency domain.

In a step 214, the constant angle mismatch is compensated in the time domain.

In a step 215, the amplitude mismatch is compensated by using the FIR filter in the time domain.

Example 2

Scenario 1: an OFDM is in a mapping manner of 256-QAM, a subcarrier spacing is 0.3125 MHz, a data bandwidth is 80 MHz, and an OFDM baseband is centered on zero frequency. An analog low-pass filter pole offset is 2%, a mixer angle mismatch is 4 degrees, a mixer amplitude mismatch is 0.5 dB, and sampling rates of the digital-to-analog converter and the analog-to-digital converter are equal to 80 MHz.

The implementation is carried out in accordance with the process shown in FIG. 15. After the system is powered on, normal communication cannot be performed directly, while the system startup state is entered. Several power-on resets and calibrations need to be completed, and calibration preparation for IQ mismatch is included. Preparations can be continued from the step 201 to the step 209, and may also be divided into two large steps. One is from the step 201 to the step 204 in which the estimation of IQ mismatch parameters is completed, and the other is from the step 205 to the step 209 in which computing of the coefficient of each compensator is completed by using the IQ mismatch parameter as an input. In the mismatch parameter estimation phase, the frequency controller is first configured (201) with the OFDM subcarrier frequency points to be scanned, and it is generally set to scan all communication subcarriers. The communication subcarriers are set to be 0.3125 MHz to 40 MHz in the embodiment, with a spacing of 0.3125 MHz and a total of 128 frequency points. After the configuration is completed, a single-tone IQ test signal is generated (202) by the transmitting component under the guidance of the controller, and the frequency is one of the previously configured frequency points. The single-tone signal will pass through the entire path shown in FIG. 3 and the mismatch parameters are estimated in the mismatch parameter estimator 302. The single-tone test signal needs to be sent four times for the mismatch estimation of any one of the frequency points number 1 to 128. Specifically, in the first step, the single-tone positive frequency signal is transmitted, passes through the angle shifter, and has an offset angle of 0 degree, and the response value R1(w) of the single-tone positive frequency point and the image frequency point response value R1(−w) of the frequency point are obtained at the receiving end through the fast Fourier transform. In the second step, a single-tone image negative frequency signal is transmitted, passes through the angle shifter, and has an offset angle of 0 degree, and the response value R2(w) of the single-tone positive frequency point and the image frequency point response value R2(−w) of the frequency point are obtained at the receiving end through the fast Fourier transform. In the third step (403), a same-frequency single-tone positive signal is transmitted, passes through the angle shifter, and has an offset angle of 90 degrees, and the response value R3(w) of the single-tone positive frequency point and the image frequency point response value R3(−w) of the frequency point are obtained at the receiving end through the fast Fourier transform. In the fourth step, an image negative frequency signal is transmitted, passes through the angle shifter, and has an offset angle of 90 degrees, and the response value R4(w) of the single-tone positive frequency point and the image frequency point response value R4(−w) of the frequency point are obtained at the receiving end through the fast Fourier transform.

Finally, the tap coefficients are computed and the first type time domain compensator, the second type time domain compensator and the frequency domain compensator are designed by using any of the foregoing formulae, to finally form the receiving component and the transmitting component as shown in FIGS. 11 and 12. In the example, the first type time domain compensator may be a 7-tap time domain compensator.

Example 3

Scenario 2: the OFDM is in a mapping manner of 256-QAM, the subcarrier spacing is 0.3125 MHz, the data bandwidth is 40 MHz, and OFDM baseband data is all on the positive frequency and is not centered on zero frequency. The analog low-pass filter pole offset is 0.2%, the mixer angle mismatch is 4 degrees, the mixer amplitude mismatch is 0.5 dB, and the sampling rates of the digital-to-analog converter and the analog-to-digital converter are equal to 160 MHz.

Implementation details: The basic process is consistent with the process in the scenario 1. The calibration preparation process is also entered in the power-on initialization state, includes the mismatch parameter estimation process and the compensator parameter computing process, and may be switched to the normal communication state after completion. The differences in implementation are as follows.

The OFDM baseband data is all on the positive frequency and is not centered on the zero frequency and if the frequency domain compensation is used, the signal will be compensated incorrectly, and thus the frequency compensator for the first type mismatch needs to be turned off. The enable switch at 1204 in FIG. 13 only needs to be set as "not enabled" so that the signal bypasses the compensator and goes directly into the time domain. And since the analog low-pass filter pole offset is 0.2% in the scenario of the present embodiment and is much smaller than the offset 2% in the embodiment 1, the loss of bypassing frequency domain compensation is not large for the final compensation effect.

Finally, the tap coefficients are computed and the first type time domain compensator, the second type time domain compensator and the frequency domain compensator are designed by using any of the foregoing formulae, to finally form the receiving component and the transmitting component as shown in FIGS. 11 and 12. In the example, the first type time domain compensator may be a 9-tap time domain compensator.

Example 4

Scenario 3: the OFDM is in a mapping manner of 16-QAM, the subcarrier spacing is 0.3125 MHz, the data bandwidth is 20 MHz, and the OFDM baseband is centered on zero frequency. The analog low-pass filter pole offset is 2%, the mixer angle mismatch is 4 degrees, the mixer amplitude mismatch is 0.5 dB, and the sampling rates of the digital-to-analog converter and the analog-to-digital converter are equal to 160 MHz.

Implementation details: The basic process is consistent with the process in the scenario 1. The calibration preparation process is also entered in the power-on initialization state, includes the mismatch parameter estimation process and the compensator parameter computing process, and may be switched to the normal communication state after completion. The differences in implementation are as follows.

The scenario is analyzed to be characterized by merely a quarter of the bandwidth in the scenario 1. For an analog low-pass filter with a large pole variation, the large variation is mainly at the high frequency. Regardless of whether the design passband of the filter is 20 MHz or 40 MHz and above, the effect on signals within 20 MHz is small. Since the input signal itself has a bandwidth of merely 20 MHz, according to the above analysis, the signal is less affected when the signal passes through the analog filter. At this time, it can be considered that merely a second type mismatch and a fourth type mismatch exist for the mismatch feature of the entire link. Therefore, the frequency domain compensator may be turned off during compensation. The enable switch at 1204 in FIG. 13 merely needs to be set as "not enabled" so that the signal bypasses the compensator and goes directly into the time domain. It should be noted that if the frequency domain compensation is still turned on at this time, the overall compensation effect will remain the same or be better, and will not deteriorate.

According to the above analysis, the third type mismatch does not exist either. In this case, a simplified amplitude compensator may be used, that is, the FIR filter is simplified into a form of having a single tap. Since the sampling rate in this scenario is equal to 160 MHz, the FIR filter structure shown in FIG. 9 should be used in accordance with content of the present disclosure. Simplification is embodied in that h(1) and h(3) in FIG. 9 are not computed and may be directly set to be 0, and that merely h(5) needs to be computed according to the following formula. The computing of tap coefficients may be referred to the foregoing embodiments, and will not be repeated here. For the estimation of mismatch parameters, a frequency range of 0.3125 MHz to 20 MHz may be selected to be scanned, with a spacing of 0.3125 MHz and a total of 64 frequency points. It is also possible to scan merely one frequency point at a position between 0 and 10 M. At this time, h(5) does not need to be computed, and the scanning result g(k) may be directly used. g(k) refers to an estimated value of an amplitude mismatch parameter at the k-frequency point. k is a sequence number of a frequency point between 0 and 10M with a spacing of 0.3125 MHz.

Example 5

Scenario 5: an OFDM is in a mapping manner of 256-QAM, a subcarrier spacing is 0.3125 MHz, a data bandwidth is 80 MHz, and an OFDM baseband is centered on zero frequency. The analog low-pass filter pole offset is 1%, the mixer angle mismatch is 4 degrees, the mixer amplitude mismatch is 0.5 dB, and the sampling rates of the digital-to-analog converter and the analog-to-digital converter are equal to 80 MHz.

Implementation details: The basic process is consistent with the process in the scenario 1. The calibration preparation process is also entered in the power-on initialization state, includes the mismatch parameter estimation process and the compensator parameter computing process, and may be switched to the normal communication state after completion. The difference in implementation is as follows.

The scenario is analyzed to be characterized by a small analog low-pass filter pole offset, and both the first type mismatch and the third type mismatch may be considered to be small. The OFDM baseband is centered on the zero frequency. Although the first type mismatch is small, the frequency compensation is still applicable and the corresponding gain may be obtained. Therefore, the frequency domain compensation for the first type mismatch should be retained in the implementation. The third type mismatch and the fourth type mismatch are compensated for together by using the FIR filter the structure of which is shown in FIG. 8. The number of taps of the FIR filter is related to the frequency variation complexity of the filter. Since the analog low-pass filter pole offset is small, the frequency variation of the filter is relatively slow and may be approximated as a constant. The computing of the tap coefficients of the FIR filter may be referred to the foregoing embodiments, and is not repeated here. In the example, the numbers are 0 to 127, and g(w) refers to the estimated value of the amplitude mismatch parameter at the frequency point of w. N is half of the total number of subcarriers (including useful subcarriers and invalid subcarriers) in the OFDM system. The total number of subcarriers is generally expressed as the number of points of fast Fourier transform (FFT) or fast inverse Fourier transform (IFFT). In the example, N=128.

The IQ mismatch compensation method for the radio frequency communication system provided by the embodiment of the present application can be mainly applied to the frequency domain compensation of the transmitting signal centered on the zero frequency point. If the current transmitting signal is not centered on the zero frequency point, the frequency domain compensator provided in the embodiment can be bypassed through the bypass switch, so that the compensation is not performed by the frequency domain compensator. Of course, if the analog low pass is not centered on the zero frequency point, the frequency domain compensator is bypassed through the switch for a reason.

In addition, if the analog low-pass filter pole offset is small, frequency domain compensation may not be performed. Here, the analog low-pass filter pole offset is small, that is, the frequency-dependent mismatch parameter is small. For example, in condition that the frequency-dependent angle mismatch parameter is less than 0.5 degrees or the frequency-dependent amplitude mismatch parameter is less than 0.1 dB, the frequency-dependent mismatch is considered to be small.

At the same time, the third condition is that: to narrow band may not be compensated for in the frequency domain. The frequency domain compensator may also bypassed through a bypass switch so that frequency domain compensation is not performed. The narrow band here may be a frequency band smaller than a preset bandwidth, such as a bandwidth less than 40 M or 80 M. In addition, for the FIR filter in the frequency domain compensator, the number of taps of the FIR filter is 1 and the tap coefficient is also 1 when the frequency dependency is very small.

It should be understood that the devices and the methods disclosed in the embodiments of the present disclosure may be implemented in other ways. The device embodiments described above are merely illustrative. For example, the unit division is merely a logical function division, and, in practice, the unit division may be implemented in other ways. For example, multiple units or components may be combined or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to actual requirements to achieve objects of the solutions in the embodiments of the present disclosure.

Moreover, various function units in embodiments of the present disclosure may all be integrated in one processing module, or each unit may be used as a separate unit, or two or more units may be integrated into one unit. The integrated function unit may be implemented by hardware or may be implemented by hardware plus a software function unit.

It should be understood by those skilled in the art that all or part of the steps in the method embodiments described above may be implemented by hardware instructed by relevant programs, these programs may be stored in a computer-readable storage medium and, when executed, these programs execute steps included in the method embodiments described above; and the preceding storage medium includes: a mobile storage device, a read-only memory (ROM), a random access memory (RAM), a magnetic disk, an optical disk or another medium capable of storing program codes.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the scope of the appended claims.

Figure 1:
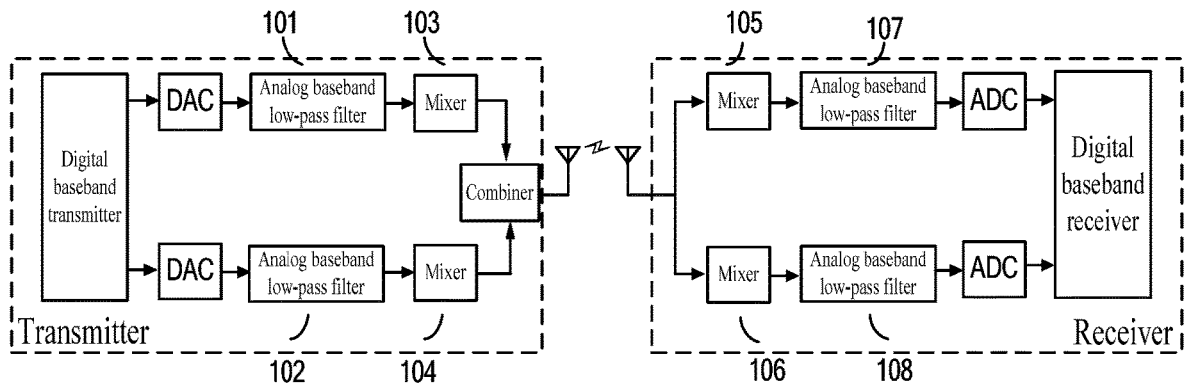
FIG. 1 is a structural diagram of a communication system according to an embodiment of the present disclosure.

An embodiment of the present disclosure further provides a computer storage medium configured to store computer programs. The computer programs are configured to execute the method for reducing the mobile terminal specific absorption rate (SAR) illustrated in FIG. 1 according to the embodiment of the present disclosure.

The above are only preferred embodiments of the present disclosure and are not intended to limit the scope of the present disclosure. Modifications made in accordance with the principles of the present disclosure should be understood as falling within the scope of the present disclosure.

INDUSTRIAL APPLICABILITY

In the embodiment of the present disclosure, at least two antennas are disposed in the mobile terminal. The first antenna is a main antenna, the second antenna is an auxiliary antenna, and the first antenna and the second antenna are diagonally placed in the mobile terminal. The external radiated power of the first antenna in the communication process of the mobile terminal is detected in real time. The mobile terminal is controlled, according to the external radiated power, to use the first antenna or the second antenna to perform communication. Therefore the SAR in the mobile terminal during communication is reduced and the electromagnetic radiation of the mobile terminal to the human body is also reduced.

What is claimed is:

1. An in-phase and quadrature (IQ) mismatch compensation method for a radio frequency communication system, comprising:

acquiring an interaction result of test signals between a transmitting component and a receiving component;

obtaining a predetermined type angle mismatch parameter according to the interaction result, wherein the predetermined type angle mismatch parameter comprises a frequency-dependent angle mismatch parameter;

determining a frequency domain compensator for performing mismatch compensation on the frequency-dependent angle mismatch parameter according to following formulae:

$$Y(w)=X(w)-jP(w)*X^*(-w);$$

$$Y(-w)=X(-w)+jP(w)*X^*(w);$$

wherein w is a sequence number of a subcarrier in a positive half frequency comprised in an orthogonal frequency division multiplexing (OFDM) baseband, $Y(w)$ and $Y(-w)$ are frequency domain signals after being performed compensation, $X(-w)$ and $X(w)$ are frequency domain signals before being performed compensation, $P(w)$ is the frequency-dependent angle mismatch parameter for the subcarrier sequence number of w, $W^*(w)$ is a conjugate complex number of $X(w)$, $X^*(-w)$ is a conjugate complex number of $X(-w)$, and j represents an imaginary part symbol; and performing frequency domain compensation on the frequency-dependent angle mismatch parameter by using the frequency domain compensator.

2. The method of claim 1, wherein the obtaining the predetermined type angle mismatch parameter according to the interaction result comprises:

obtaining a cooperation mismatch parameter of a frequency-dependent amplitude mismatch and a constant amplitude mismatch; and wherein the method further comprises:

determining a number of taps of a finite impulse response (FIR) filter in a first type time domain compensator according to a relationship between a sampling rate of a communication device and an OFDM data bandwidth;

determining, according to the number of taps, a number of delay (D) flip-flops sequentially connected in series in the FIR filter;

determining delay time of the FIR filter to an input signal according to the number of D flip-flops;

determining a delayer connected in parallel with the FIR filter, wherein delay time of the delayer is equal to the delay time of the FIR filter to the input signal;

determining a tap coefficient of each tap of the FIR filter according to the cooperation mismatch parameter; and performing compensation on the frequency-dependent amplitude mismatch and the constant amplitude mismatch by using the first type time domain compensator.

3. The method of claim 2, wherein the determining the number of taps of the FIR filter in the first type time domain compensator according to the relationship between the sampling rate of the communication device and the OFDM data bandwidth comprises:
  in condition that the sampling rate is the same as the OFDM data bandwidth, determining that the number of taps in the first type time domain compensator is five; and
  the determining the tap coefficient of the each tap of the FIR filter according to the cooperation mismatch parameter comprises:
  determining the tap coefficient according to following formulae:

$$h(1) = h(5) = \frac{1}{2N}\left[2\sum_{w=1}^{N-1} g(w)\cos\left(\frac{2\pi w}{N}\right) + g(0) + g(N)\right]$$

$$h(2) = h(4) = \frac{1}{2N}\left[2\sum_{w=1}^{N-1} g(w)\cos\left(\frac{\pi w}{N}\right) + g(0) - g(N)\right]$$

$$h(3) = \frac{1}{N}\left[\sum_{w=0}^{N-1} g(w)\right]$$

wherein h(1) is a first tap coefficient, h(2) is a second tap coefficient, h(3) is a third tap coefficient, h(4) is a fourth tap coefficient, h(5) is a fifth tap coefficient, w represents a subcarrier sequence number of a subcarrier comprised in a positive half frequency in the OFDM data bandwidth, g(w) is a cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

4. The method of claim 2, wherein
the determining the number of taps of the FIR filter in the first type time domain compensator according to the relationship between the sampling rate of the communication device and the OFDM data bandwidth further comprises:
in condition that the sampling rate is twice the OFDM data bandwidth, determining that the number of taps in the first type time domain compensator is 9; and
wherein the determining the tap coefficient of the each tap of the FIR filter according to the cooperation mismatch parameter comprises:
determining the tap coefficient according to following formulae:

$$h(1) = h(9) = \frac{1}{2N}\left[2\sum_{w=1}^{N-1} g(w)\cos\left(\frac{2\pi w}{N}\right) + g(0) + g(N)\right];$$

$$h(3) = h(7) = \frac{1}{2N}\left[2\sum_{w=1}^{N-1} g(w)\cos\left(\frac{\pi w}{N}\right) + g(0) - g(N)\right];$$

$$h(5) = \frac{1}{N}\left[\sum_{w=0}^{N-1} g(w)\right];$$

$$h(2) = h(4) = h(6) = h(8) = 0;$$

wherein h(1) is a first tap coefficient, h(2) is a second tap coefficient, h(3) is a third tap coefficient, h(4) is a fourth tap coefficient, h(5) is a fifth tap coefficient, h(6) is a sixth tap coefficient, h(7) is a seventh tap coefficient, h(8) is an eighth tap coefficient, and h(9) is a ninth tap coefficient, w represents a subcarrier sequence number of a subcarrier comprised in a positive half frequency in the OFDM data bandwidth, g(w) is a cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

5. The method of claim 2, wherein the predetermined type angle mismatch parameter further comprises: a constant angle mismatch parameter; and
  wherein the method further comprises:
  determining a second type time domain compensator; and
  performing compensation on a constant angle mismatch corresponding to the constant angle mismatch parameter by using the second type time domain compensator.

6. The method of claim 5, further comprising:
  in condition that the communication device is the transmitting component, performing mismatch pre-compensation for a mismatch of a transmitting signal by using the frequency domain compensator, the second type time domain compensator, and the first type time domain compensator in sequence; and
  in condition that the communication device is the receiving component, performing mismatch compensation on a received signal by using the first type time domain compensator, the second type time domain compensator, and the frequency domain compensator in sequence.

7. The method of claim 6, further comprising:
  enabling or disabling the frequency domain compensator, the first type time domain compensator and the second type time domain compensator according to the predetermined type angle mismatch parameter.

8. A non-transitory computer storage medium configured to store computer-executable instructions, wherein the computer-executable instructions are used for executing the method of claim 1.

9. The method of claim 5, further comprising:
  in condition that the communication device is the transmitting component, performing mismatch pre-compensation for a mismatch of a transmitting signal by using the frequency domain compensator, the second type time domain compensator, and the first type time domain compensator in sequence.

10. The method of claim 5, further comprising:
  in condition that the communication device is the receiving component, performing mismatch compensation on a received signal by using the first type time domain compensator, the second type time domain compensator, and the frequency domain compensator in sequence.

11. A compensation device, comprising a frequency domain compensator for performing frequency domain compensation on a frequency-dependent mismatch parameter, wherein the frequency domain compensator comprises: a first adder, a second adder, a first multiplier, and a second multiplier;

wherein the first adder is connected to the first multiplier;
wherein the second adder is connected to the second multiplier;
wherein the first multiplier is configured to compute −jP(w)*X*(−w);
wherein the second multiplier is configured to compute jP(w)*X*(w);
wherein the first adder is configured to compute X(w)−jP(w)*X*(−w) to obtain Y(w); and
wherein the second adder is configured to compute X(−w)+jP(w)*X*(w) to obtain Y(−w);
wherein w is a sequence number of a subcarrier in a positive half frequency comprised in an orthogonal frequency division multiplexing (OFDM) baseband, Y(w) and Y(−w) are frequency domain signals after being performed compensation, X(−w) and X(w) are frequency domain signals before being performed compensation, P(w) is a frequency-dependent angle mismatch parameter for the subcarrier sequence number of w, X*(w) is a conjugate complex number of X(w), X*(−w) is a conjugate complex number of X(−w), and j represents an imaginary part symbol.

12. The compensation device of claim 11, further comprising a first type time domain compensator configured to perform compensation on a frequency-dependent amplitude mismatch and a constant amplitude mismatch, wherein the first type time domain compensator comprises:
a finite impulse response (FIR) filter; and
a delayer having delay time equal to delay time of the FIR filter to an input signal, wherein the delayer is connected in parallel with the FIR filter;
wherein the FIR filter comprises a plurality of delay (D) flip-flops connected in series; a number of D flip-flops is determined according to a number of taps of the FIR filter; the number of taps is determined based on a relationship between a sampling rate of a communication device and an OFDM data bandwidth; and
wherein a tap coefficient of a tap is determined by a cooperation mismatch parameter of the frequency-dependent amplitude mismatch and the constant amplitude mismatch.

13. The compensation device of claim 12, wherein in condition that the sampling rate is the same as the OFDM data bandwidth, the number of taps in the first type time domain compensator is determined to be five; and
five tap coefficients are determined according to following formulae;

$$h(1) = h(5) = \frac{1}{2N}\left[2\sum_{w=1}^{N-1} g(w)\cos\left(\frac{2\pi w}{N}\right) + g(0) + g(N)\right]$$

$$h(2) = h(4) = \frac{1}{2N}\left[2\sum_{w=1}^{N-1} g(w)\cos\left(\frac{\pi w}{N}\right) + g(0) - g(N)\right]$$

$$h(3) = \frac{1}{N}\left[\sum_{w=0}^{N-1} g(w)\right]$$

wherein h(1) is a first tap coefficient, h(2) is a second tap coefficient, h(3) is a third tap coefficient, h(4) is a fourth tap coefficient, h(5) is a fifth tap coefficient, w represents a subcarrier sequence number of a subcarrier comprised in a positive half frequency in the OFDM data bandwidth, g(w) is a cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

14. The compensation device of claim 12, wherein in condition that the sampling rate is twice the OFDM data bandwidth, the number of taps in the first type time domain compensator is determined to be nine; and
nine tap coefficients are determined according to following formulae;

$$h(1) = h(9) = \frac{1}{2N}\left[2\sum_{w=1}^{N-1} g(w)\cos\left(\frac{2\pi w}{N}\right) + g(0) + g(N)\right];$$

$$h(3) = h(7) = \frac{1}{2N}\left[2\sum_{w=1}^{N-1} g(w)\cos\left(\frac{\pi w}{N}\right) + g(0) - g(N)\right]$$

$$h(5) = \frac{1}{N}\left[\sum_{w=0}^{N-1} g(w)\right]$$

$$h(2) = h(4) = h(6) = h(8) = 0$$

wherein h(1) is a first tap coefficient, h(2) is a second tap coefficient, h(3) is a third tap coefficient, h(4) is a fourth tap coefficient, h(5) is a fifth tap coefficient, h(6) is a sixth tap coefficient, h(7) is a seventh tap coefficient, h(8) is an eighth tap coefficient, and h(9) is a ninth tap coefficient, w represents a subcarrier sequence number of a subcarrier comprised in a positive half frequency in the OFDM data bandwidth, g(w) is a cooperation mismatch parameter on a frequency corresponding to w, N is a half of a total number of subcarriers of the OFDM baseband, g(0) is a cooperation mismatch parameter on a frequency corresponding to a subcarrier sequence number 0, and g(N) is a cooperation mismatch parameter on a frequency corresponding to a subcarrier sequence number N.

15. The compensation device of claim 12, further comprising a second type time domain compensator configured to perform compensation on a constant angle mismatch.

16. The compensation device of claim 15, further comprising an enable switch, wherein the enable switch is configured to enable or disable the frequency domain compensator, the first type time domain compensator and the second type time domain compensator according to a predetermined type mismatch parameter.

17. A computer device, comprising a compensation device, wherein the compensation device comprises a frequency domain compensator for performing frequency domain compensation on a frequency-dependent mismatch parameter, wherein the frequency domain compensator comprises: a first adder, a second adder, a first multiplier, and a second multiplier;
wherein the first adder is connected to the first multiplier;
wherein the second adder is connected to the second multiplier;
wherein the first multiplier is configured to compute −jP(w)*X*(−w);
wherein the second multiplier is configured to compute jP(w)*X*(w);
wherein the first adder is configured to compute X(w)−jP(w)*X*(−w) to obtain Y(w); and wherein the second adder is configured to compute $X(-w)+jP(w)*X*(w)$ to obtain $Y(-w)$;

wherein w is a sequence number of a subcarrier in a positive half frequency comprised in an orthogonal frequency division multiplexing (OFDM) baseband, $Y(w)$ and $Y(-w)$ are frequency domain signals after being performed compensation, $X(-w)$ and $X(w)$ are frequency domain signals before being performed compensation, $P(w)$ is a frequency-dependent angle mismatch parameter for the subcarrier sequence number of w, $X*(w)$ is a conjugate complex number of $X(w)$, $X*(-w)$ is a conjugate complex number of $X(-w)$, and j represents an imaginary part symbol.

* * * * *